United States Patent
Richter et al.

(10) Patent No.: US 10,363,813 B2
(45) Date of Patent: Jul. 30, 2019

(54) INTEGRATED MOTOR AND AXLE APPARATUS AND METHOD

(71) Applicant: GENERAL ELECTRIC COMPANY, Schenectady, NY (US)

(72) Inventors: Timothy Richter, Erie, PA (US); Patrick Jansen, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 0 days.

(21) Appl. No.: 15/524,904

(22) PCT Filed: Nov. 24, 2015

(86) PCT No.: PCT/US2015/062371
§ 371 (c)(1),
(2) Date: May 5, 2017

(87) PCT Pub. No.: WO2016/085951
PCT Pub. Date: Jun. 2, 2016

(65) Prior Publication Data
US 2018/0037108 A1 Feb. 8, 2018

Related U.S. Application Data

(60) Provisional application No. 62/083,621, filed on Nov. 24, 2014.

(51) Int. Cl.
*B60K 17/24* (2006.01)
*B60K 17/356* (2006.01)
(Continued)

(52) U.S. Cl.
CPC ............. *B60K 17/24* (2013.01); *B60K 17/22* (2013.01); *B60K 17/34* (2013.01); *B60K 17/356* (2013.01);
(Continued)

(58) Field of Classification Search
CPC ........ B60K 17/24; B60K 17/22; B60K 17/34; B60K 17/356; H02K 7/003; H02K 7/006; H02K 5/173
See application file for complete search history.

(56) References Cited

U.S. PATENT DOCUMENTS 4,718,509 A * 1/1988 Ehrlinger ............. B60K 17/046
180/24.08
4,795,403 A * 1/1989 Heine ..................... B60K 17/22
464/160
(Continued)

FOREIGN PATENT DOCUMENTS

| JP | 2010-154699 A | 7/2010 |
|---|---|---|
| JP | 2011-244551 A | 12/2011 |
| WO | 2016/085951 A1 | 6/2016 |

OTHER PUBLICATIONS

International Search Report and Written Opinion issued in connection with corresponding PCT Application No. PCT/US2015/062371 dated May 30, 2017.
(Continued)

*Primary Examiner* — Frank B Vanaman
(74) *Attorney, Agent, or Firm* — McCoy Russell LLP (57) ABSTRACT

An apparatus (e.g., for a vehicle) includes a housing, an oscillation bearing, and a hollow rotor shaft. The housing has a first end and a second end, and includes a first end cap at the first end thereof and a second end cap at the second end thereof. The oscillation bearing is housed within the second end cap. The hollow rotor shaft extends through the housing from the first end to the second end, and has a first shaft end having an interior spline surface, and a second shaft end. The interior spline surface of the hollow rotor shaft is configured to receive a splined end of an internal rear drive shaft and a splined end of a front drive shaft.

17 Claims, 11 Drawing Sheets

(51) Int. Cl.
  *H02K 5/173*   (2006.01)
  *H02K 7/14*    (2006.01)
  *H02K 7/00*    (2006.01)
  *B60K 17/22*   (2006.01)
  *B60K 17/34*   (2006.01)
  *B60L 50/50*   (2019.01)
  *B60K 1/04*    (2019.01)

(52) U.S. Cl.
  CPC .............. *B60L 50/50* (2019.02); *H02K 5/173* (2013.01); *H02K 7/003* (2013.01); *H02K 7/14* (2013.01); *B60K 2001/0416* (2013.01); *B60K 2001/0444* (2013.01); *B60Y 2200/412* (2013.01); *B60Y 2200/415* (2013.01); *B60Y 2200/417* (2013.01); *B60Y 2200/91* (2013.01)

(56) References Cited

U.S. PATENT DOCUMENTS

| | | | | |
|---|---|---|---|---|
| 5,207,060 | A | * | 5/1993 | Sheets .................. B60K 17/356 180/242 |
| 5,267,914 | A | * | 12/1993 | Eastman ................ B60K 17/34 180/248 |
| 5,441,351 | A | * | 8/1995 | Grunze ................ F16C 23/086 384/450 |
| 5,620,387 | A | * | 4/1997 | Janiszewski ............ B60K 1/00 475/150 |
| 5,804,935 | A | * | 9/1998 | Radev .................. B60K 17/356 180/65.7 |
| 8,561,732 | B2 | | 10/2013 | Schoon |
| 2003/0196842 | A1 | | 10/2003 | Hashimoto |
| 2005/0262955 | A1 | * | 12/2005 | Rankin .................. B60K 17/02 74/325 |
| 2007/0093343 | A1 | * | 4/2007 | Hoff ....................... B60K 17/16 475/6 |
| 2007/0181358 | A1 | * | 8/2007 | Nakagaki ............... B60K 17/22 180/233 |
| 2009/0321156 | A1 | * | 12/2009 | Perkins .................... B60K 6/26 180/65.7 |
| 2012/0219351 | A1 | | 8/2012 | Besler et al. |

OTHER PUBLICATIONS

International Preliminary Report on Patentability issued in connection with corresponding PCT Application No. PCT/US2015/062371 dated May 30, 2017.

Jansen, P.L., et al., Heat transfer apparatus utilizing vehicle chassis, GE co-pending U.S. Appl. No. 62/083,816, filed Nov. 24, 2014.

* cited by examiner

INTEGRATED MOTOR AND AXLE APPARATUS AND METHOD

BACKGROUND

Technical Field

Embodiments of the invention relate generally to vehicles powered by stored electrical energy. Particular embodiments relate to electric powered vehicles used in underground mines.

Discussion of Art

Underground mining operations can extend as deep as two miles vertically and for many miles horizontally into the ground. Although elevators in vertical shafts may be used for lifting ore up from the sub-levels of a mine, it is prohibitively expensive to put vertical shafts all along a miles-long gallery. Accordingly, heavy-duty off-highway vehicles ("OHVs") are used to haul the ore along the galleries to the extraction shafts. As ventilation of underground mines already is a challenging task, it is desirable for such vehicles to have minimal emissions. As will be appreciated, it would be particularly desirable to build OHVs as zero-emissions vehicles, i.e., powered by stored energy, so as to avoid any additional ventilation loading from their operation.

A potential drawback to the utilization of zero-emission vehicles in a mining context, and, indeed, in any context, is the need for sufficient on-board energy storage. While vehicles may simply be sized to accommodate their energy storage needs, it is desirable to efficiently utilize on-board space in a way that allows for batteries and any associated change out equipment to be contained within a relatively compact vehicle footprint.

Another challenge in underground mining operations is that certain types of equipment need to operate below a certain temperature. If that temperature is exceeded, the equipment may fail and under certain circumstances may fail catastrophically. Essentially, heat must be dissipated to avoid temperature rises that could cause damage to components such as battery cells, motor insulation, semiconductor power converters, and other equipment. In particular, battery electric vehicles generate heat because of inefficiencies in electrical to mechanical power conversion devices such as power electronics, wiring, and motors. Similarly, battery cells also generate heat in the same manner.

Common thermal dissipation methods involve either the use of air or liquid to provide cooling. In air cooling, air is forced across the surface of the equipment in order to dissipate the heat. Air cooling may be enhanced by adding fins to increase the surface area or by using fans or blowers to increase the volume of air that is forced across the surface of the equipment. In essence, the relatively large surface area of the fins allows heat to be transferred from the fins to the air and removed from the system. Dust and fan reliability may limit the efficiency of air cooling. In liquid cooling systems a fluid is circulated through plumbing to extract heat from the heat source. The liquid is then routed through a radiator a radiator which subsequently cools the fluid using air cooling as discussed above.

Both air and liquid cooling systems require adding volume to the system and introduce complexity into the system, which increases the likelihood of failure because each introduces active components that are susceptible to wear and failure.

In view of the above, it may be desirable to provide an apparatus and methods for maximizing on-board energy storage, and/or for heat transfer, to facilitate the use of battery powered vehicles generally in a mining environment or otherwise, and, in particular, zero-emissions OHVs.

BRIEF DESCRIPTION

In an embodiment, an apparatus (e.g., an apparatus for a vehicle) includes a housing, an oscillation bearing, and a hollow rotor shaft. The housing has a first end and a second end, and includes a first end cap at the first end thereof and a second end cap at the second end thereof. The oscillation bearing is housed within the second end cap. The hollow rotor shaft extends through the housing from the first end to the second end, and has a first shaft end having an interior spline surface, and a second shaft end. The interior spline surface of the hollow rotor shaft is configured to receive a splined end of an internal rear drive shaft and a splined end of a front drive shaft.

In an embodiment, a system (e.g., a vehicle system) includes an electric motor and an axle coupled to the electric motor. The electric motor includes a housing having a first end and a second end, a hollow rotor shaft extending through the housing from the first end to the second end, and a rear drive shaft. The hollow rotor shaft has a first shaft end having an interior spline surface, and a second shaft end. The rear drive shaft is received within the hollow rotor shaft. The rear drive shaft has a first splined end mating with the interior spline surface of the hollow rotor shaft and a second splined end opposite the first end. The axle includes an axle input shaft having an internal splined surface receiving the second splined end of the rear drive shaft.

In an embodiment, a method of assembling a vehicle includes mounting an electric motor and an axle to a frame of the vehicle. The motor has a housing having a first end and a second end, and a hollow rotor shaft extending through the housing from the first end to the second end. The hollow rotor shaft has a first shaft end having an interior spline surface, and a second shaft end. The method further includes inserting a rear drive shaft into the hollow rotor shaft from the first end until a first splined end of the rear drive shaft mates with an axle input shaft of the axle and a second splined end of the rear drive shaft mates with an interior splined surface of the hollow rotor shaft.

In an embodiment, a heat transfer apparatus includes at least one steel plate or other metal plate, at least one channel formed in the metal plate (e.g., by machining or molding), and at least one mounting point to secure the metal plate to a vehicle chassis. The channel is formed to accept a heat pipe. In a further embodiment, a respective heat pipe is secured in each of the channels formed in the metal plate. The heat pipe may be secured in the channel using an epoxy or any other means which provides sufficient heat transfer between the heat pipe and the metal plate.

In an embodiment, the apparatus may include a plurality of metal (e.g., steel) plates secured to each other to form a stack of metal plates. Each of the metal plates includes one or more channels and heat pipes disposed in the channels.

In an embodiment, the metal plate is secured to the vehicle chassis such that one end of the heat pipe is exposed to a propulsion component having a temperature that is higher than one or more other components of the vehicle, such that the heat pipe conducts heat from the propulsion component to the chassis and the heat is transferred to the chassis and dissipated.

In an embodiment, a heat transfer apparatus includes an electrical machine (e.g., a motor) having a stator and a heat pipe. A first end of the heat pipe is attached to the stator and a second end of the heat pipe is attached to a vehicle chassis. The heat pipe is configured to transfer heat from the stator to the vehicle chassis.

In an embodiment, the stator may include stator laminations, and the heat pipe is inserted radially into the stator laminations such that the heat pipe is routed through regions of the laminations that have a lower electromagnetic flux (during operation of the electrical machine) than at least one other region of the laminations.

In an embodiment, the second end of the heat pipe may be attached to mounting tabs on the vehicle chassis. In an alternate embodiment, the second end of the heat pipe is attached to heat spreaders attached to the chassis.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to zero-emissions mining vehicles, such as loader hauler or crew transport vehicles, embodiments of the invention also are applicable for use with vehicles generally. In addition, embodiments of the present invention are equally applicable to any type of machinery, motive or non-motive, that includes a motor.

As used herein, a "zero-emissions" vehicle is one that during its operation does not reduce the availability of breathable air in its vicinity. However, the invention may also be applicable to "hybrid" vehicle, i.e., vehicles provided both with a "secondary" energy storage device (i.e., an energy storage device that is easily rechargeable) as well as a "primary" chemical energy production device (e.g., a combustion engine).

Embodiments of the invention are intended to reduce emission and operating cost of underground mines by electrifying underground material and/or people transport vehicles using energy storage as the power and energy source. Embodiments are also intended to reduce the vehicle size, which is useful in a confined mining space, such as block caving mines.

Figure 1:
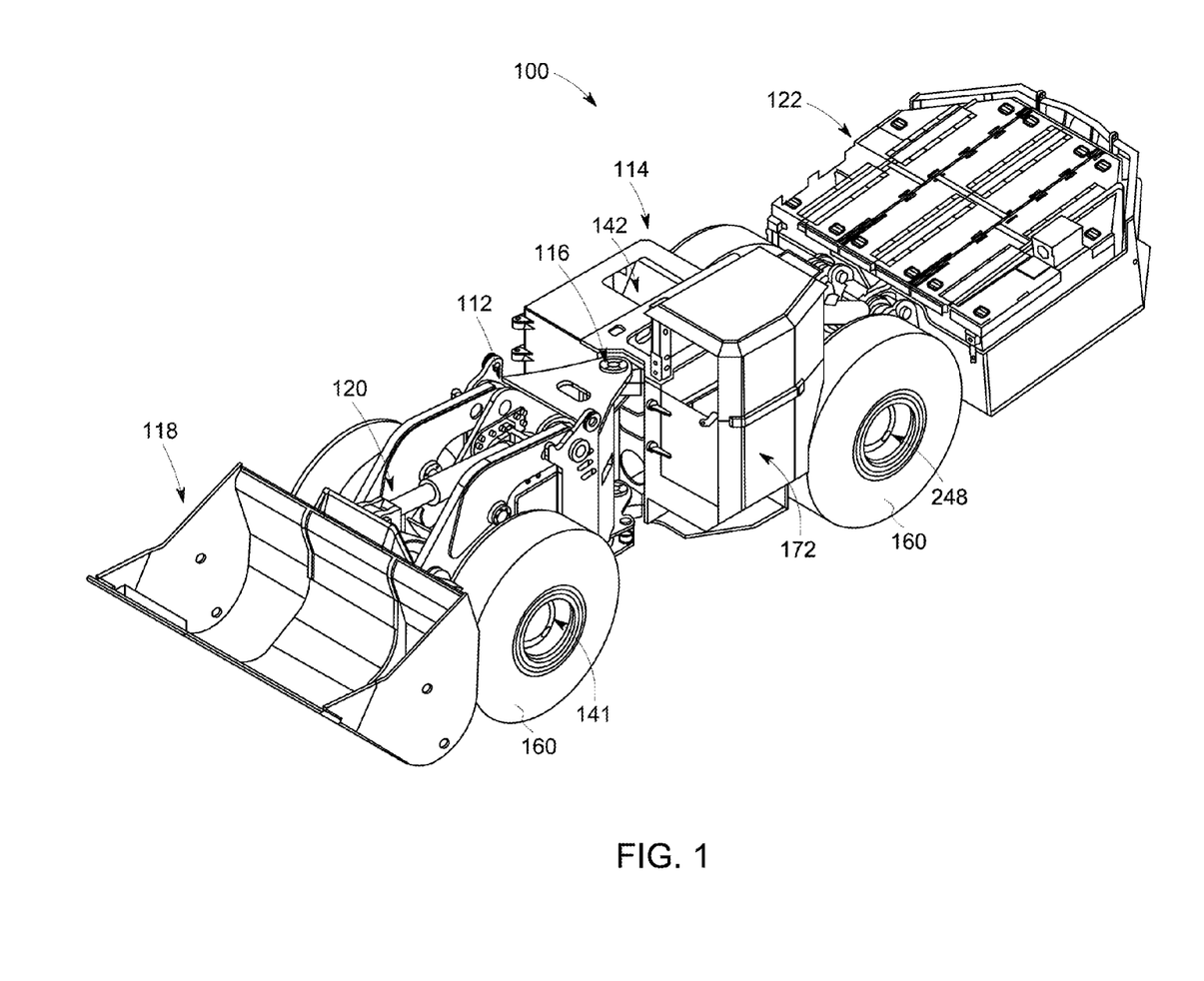
FIG. 1 is a perspective view of a vehicle having oscillation mounts suitable for use in embodiments of the invention.
Figure 2:
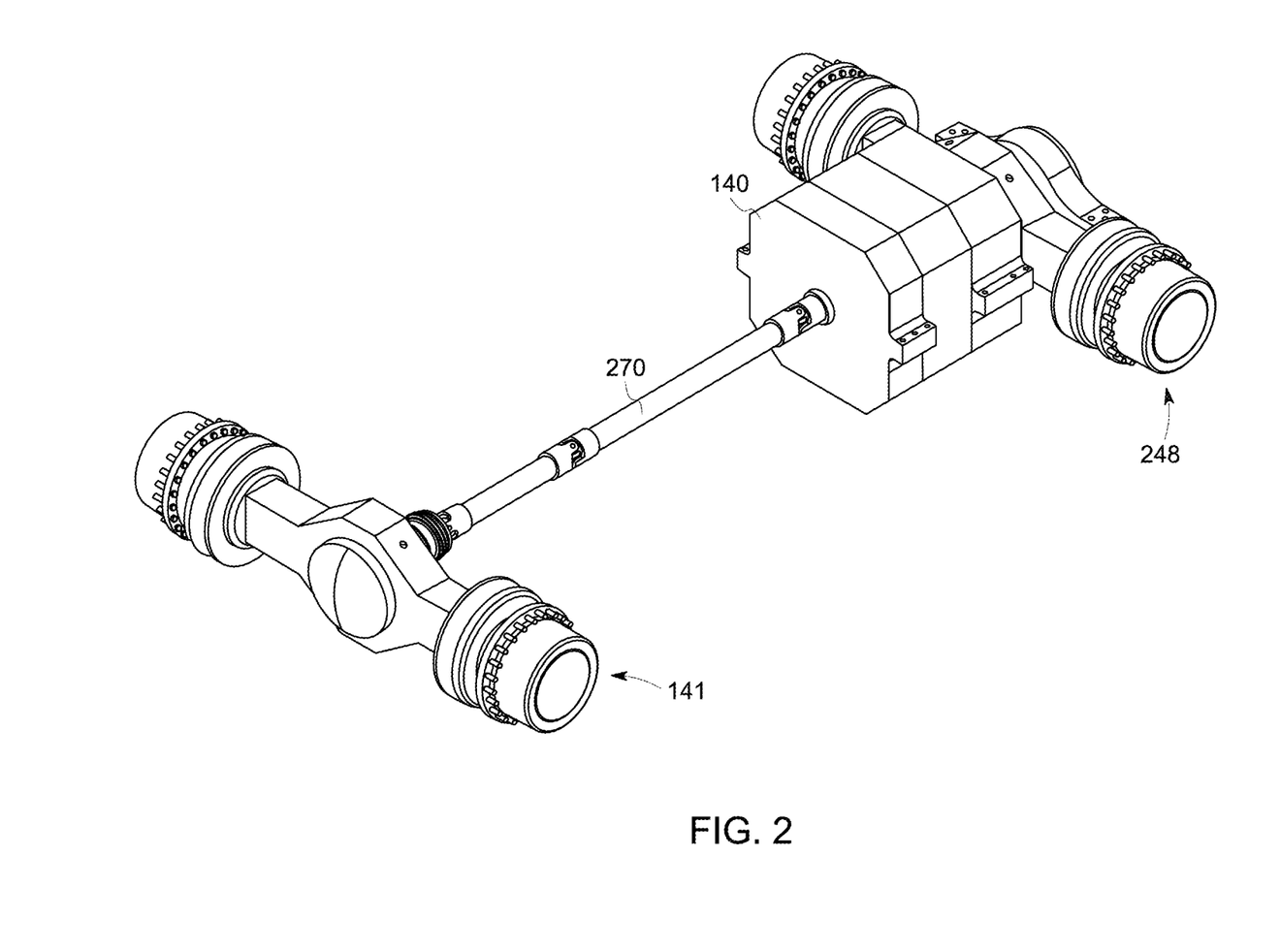
FIG. 2 is a perspective view of an integrated motor and axle of the vehicle of FIG. 1, according to an embodiment of the invention.
Figure 3:
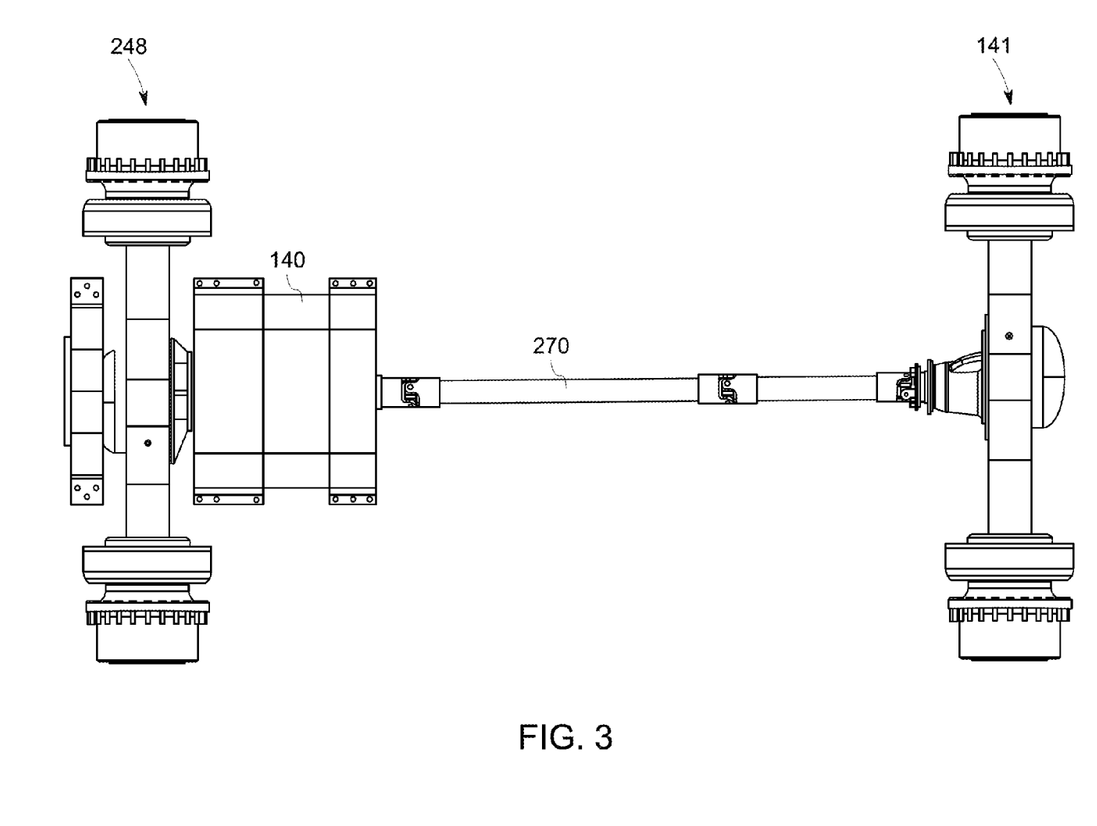
FIG. 3 is a top plan view of the integrated motor and axle of FIG. 2.

Referring to FIGS. 1-3, embodiments of the invention provide an electric motor 140 that is directly coupled to the rear axle of a vehicle 100, e.g., a mining haul vehicle, to create a compact, integrated motor and axle. As illustrated in FIG. 1, in the case where the vehicle 100 is a mining haul vehicle, the vehicle may include a front chassis 112 connected to a rear chassis 114 through an articulated joint 116. In such an example, the vehicle 100 may also include a scoop or bucket 118 at the front thereof for moving mined material. The bucket 118 is operable via a hydraulic lift assembly 120. (Alternatively or additionally, a mining vehicle may include some other work member, such as fork lift, platform lift, etc.) A rear of the vehicle 100 is provided with a battery tray 122 housing a plurality of batteries for providing motive power to the vehicle 100 and its accessories.

With specific reference to FIGS. 2 and 3, the drive assembly of the vehicle 100, comprising the electric motor 140, front axle 141, and rear axle 248, is illustrated. The drive assembly also includes a drive shaft 270, which is discussed in more detail further below.

Figure 4:
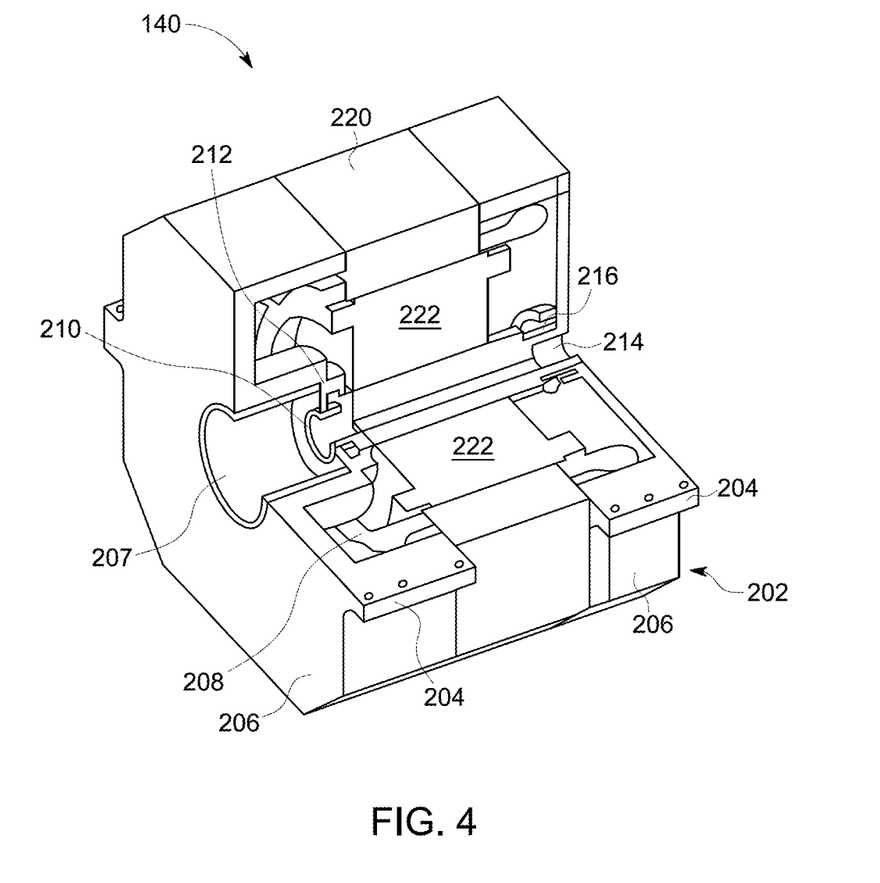
FIG. 4 is an enlarged, cutaway perspective view of the integrated motor and axle of FIG. 2.
Figure 5:
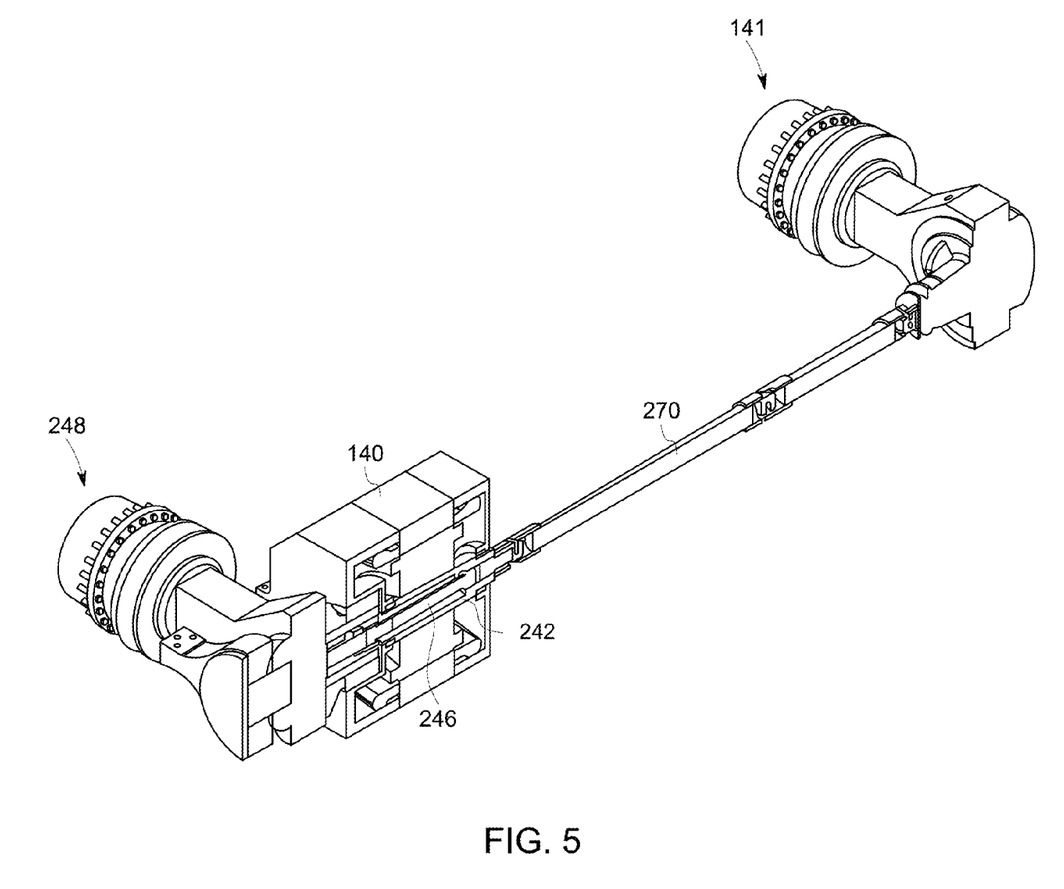
FIG. 5 is a cutaway perspective view of the integrated motor and axle of FIG. 2.
Figure 6:
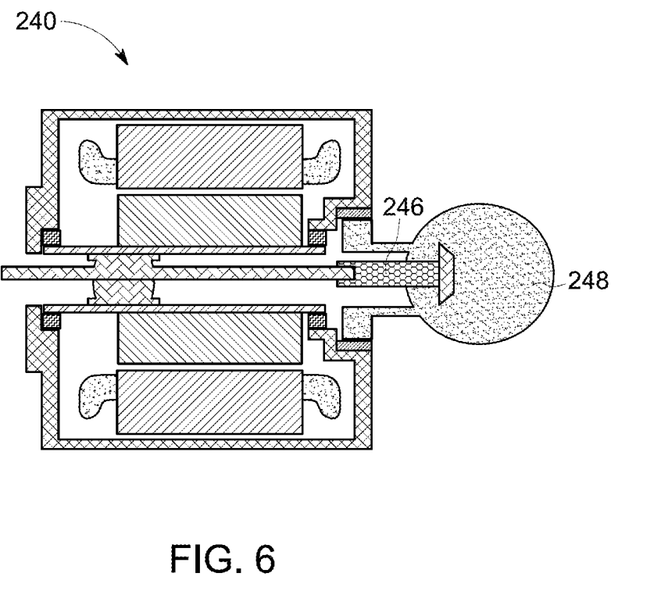
FIG. 6 is a cross sectioned view of a motor and axle of according to embodiments of the invention, depicting a crowned spline shaft.

Turning to FIG. 4, in an embodiment, the motor 140 includes oscillation bearings, one of which is mounted within a motor end cap. The motor 140, and vehicle 100, may also utilize an additional oscillation bearing mounted in a traditional cross member. The use of oscillation bearings allows the axles to oscillate, or rotate, along a longitudinal vehicle axis, typically up to 8-10 degrees, to ensure balanced ground contact. In certain embodiments, the motor 140 can be connected to a plurality of axles providing multiple wheel drive capability. The motor 140 may be used with vehicles in which steering is accomplished through an articulated joint 116, allowing, for example, one degree of freedom between front and rear vehicle frames.

As illustrated in FIG. 4, the motor 140 includes a housing 202 having first and second end caps 206 defining a first end and a second end of the housing, respectively. The end caps 206 are configured to contain stator end windings, facilitate torque transfer from the motor to the front and rear axles, as well as allow for axle oscillation. While depicted as a frameless motor with end caps 206, which allows for high heat conduction and low weight, the electric motor 140 can be of any type including, but not limited to, induction, permanent magnet, switched reluctance, etc. In certain embodiments, the motor stator is constructed of laminations that are exposed to the ambient air for maximum cooling efficiency.

The motor 140 also features integral motor and axle support brackets 204. In an embodiment, the motor 140 acts as a structural member removably securing the axle to the vehicle frame 142 via brackets 204. As will be appreciated, depending on vehicle specifics, the shape, position and number of support brackets 204 may vary. In the depicted embodiment, the brackets 204 are formed on the end caps 206 and the motor 140 can be mounted to a vehicle frame 142 from the top or from the side depending of the location of the brackets 204, or similar structures, e.g., tabs/supports, on the end caps 206.

As further illustrated in FIG. 4, the motor 140 further includes an axle oscillation bearing 207 at one end of the housing 202. The oscillation bearing 207 allows the axle to pivot along the length of the vehicle to maintain ground contact through the tires. In an embodiment, the oscillation bearing 207 is contained within an end cap 206 of the housing 202. The oscillation bearing 207 for the rear axle is held in place by the traction motor frame. To ease assembly of the axle and motor, the axle oscillation bearing 207 can be a split type with, in an embodiment, a mechanism to tighten and release the bearing around an axle bearing surface.

As mentioned, the end caps 206 contain stator end windings 208 of the motor. The stator end windings 208 surround the axle oscillation bearing 207 also contained within an end cap 206. The housing 202 also includes components for operably connecting the motor 140 to the axles. In the depicted embodiment, these components include a front axle spline 210 and cylindrical roller bearing 212 (second bearing) and a rear axle spline 214 with a ball bearing 216 (first bearing). As shown, the motor 140 further includes the stator 220 and a rotor 222.

Referring back to FIGS. 1, 2, and 3, the motor 140 is located between the rear axle 248 and the operator cabin 172 of the vehicle 100. The location of the motor 140, coupled with its compact dimensions, completely frees the area rear of the wheels 160 to contain the battery tray and, in certain embodiments, a swap mechanism (not shown). Hydraulics are located above the electric motor 140. In an embodiment, the front of the motor 140 is connected through a traditional drive train of shafts and universal joints. In embodiments, the motor 140 is driven by a power electronics drive, which is controlled via a controller. The controller can provide system commands to control motor torque, speed, and fault detection. The motor may also include an encoder for position indication, or may be configured to operate without an encoder, utilizing encoderless technology.

In addition to eliminating the need for an internal combustion engine, fuel tanks, and related components, embodiments further reduce the number of required electrical components. In an embodiment, the motor 140 eliminates need for an electrically driven hydrostatic drive and related cooling components. This, in turn, frees valuable onboard space for energy storage as well as functional equipment, e.g., controls, traction drive, and the like, or, for example, equipment such as a tether cable reel.

In embodiments, the motor can be used with vehicles that include energy storage devices that are exchangeable or "swappable," e.g., externally mounted to the vehicle body in a manner permitting rapid removal from the vehicle body. For example, an energy storage device may be externally mounted to the vehicle body by a mounting apparatus that includes at least one of hooks, latches, or retractable fasteners, such that the mounting apparatus can be quickly withdrawn or deactivated or detached by remote command, in order to permit removal of the storage device. In certain embodiments, the energy storage device is mounted in such a way that on detachment the energy storage device will fall or slide from the vehicle.

Referring now to FIGS. 5-11, embodiments of the invention further include a mechanism to counteract any misalignment, deflection, or thermal stress on the shaft that connects the motor to the axle, i.e., the axle input shaft, to create a robust connection between these components. As will be appreciated, any flexure in the vehicle frame, motor support, or axle supports can transmit torque to the input shaft and oscillation bearing support. To help address this potential issue, embodiments of the invention decouple external torque from the rotor of the motor. Moreover, in this embodiment, the axle and the motor are separately mounted to the vehicle frame. As will be appreciated, however, other mounting configurations are possible such as the configuration discussed above wherein the axle is mounted to the frame via the motor.

Figure 7:
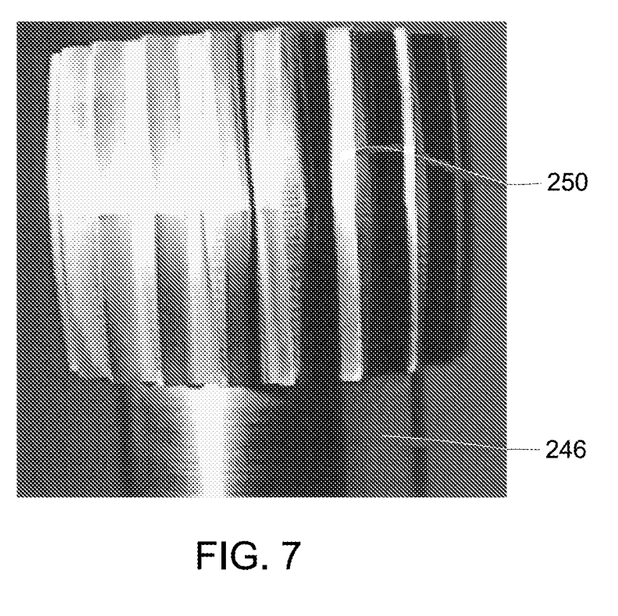
FIG. 7 depicts an example of crowned splining suitable for use with embodiments of the invention.
Figure 8:
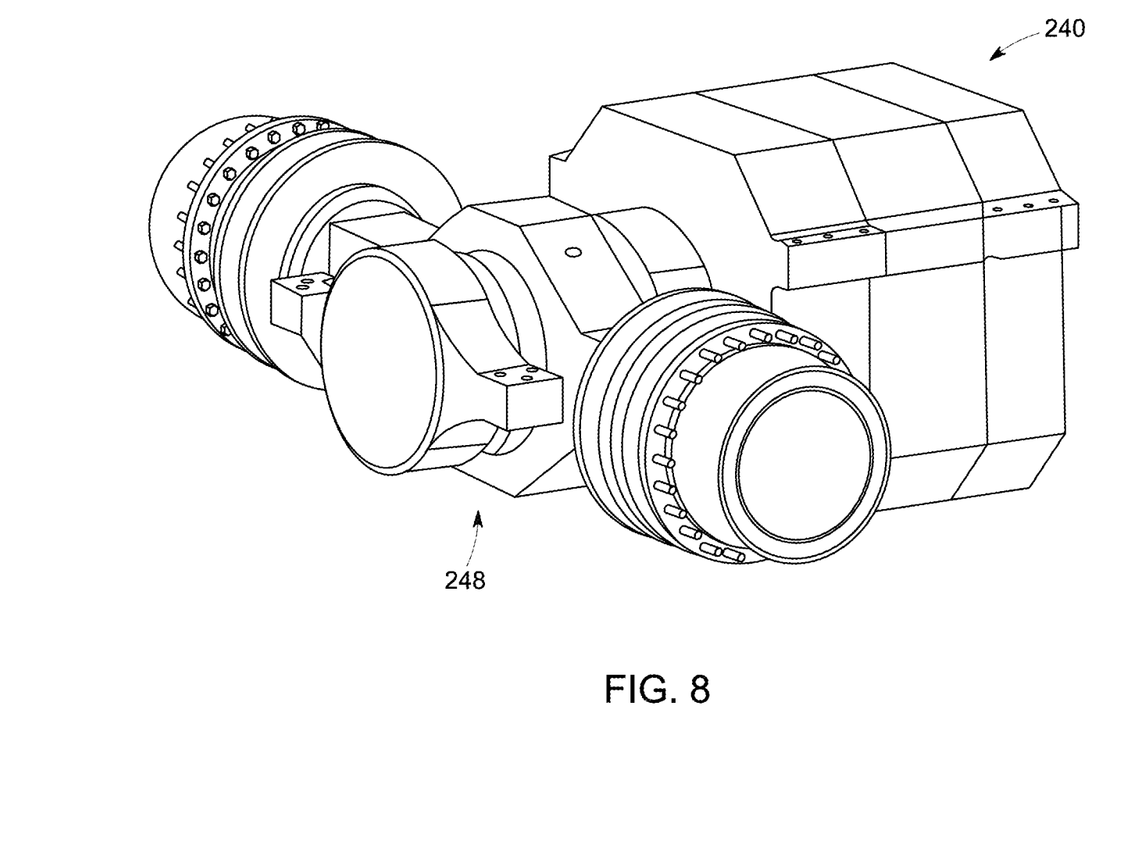
FIG. 8 is a perspective view of a motor coupled to an axle according to an embodiment of the invention.
Figure 9:
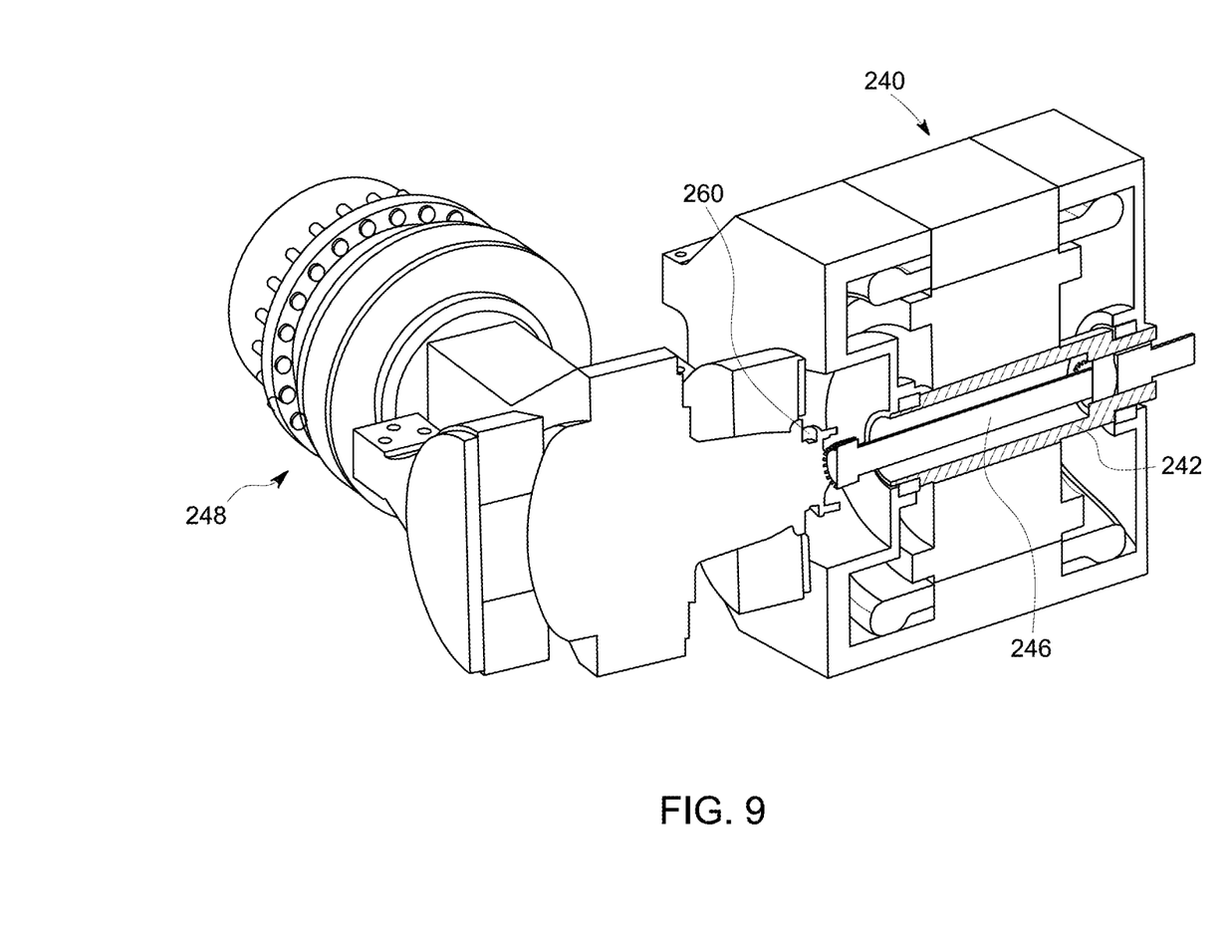
FIG. 9 is a cutaway perspective view of the motor and axle of FIG. 8.
Figure 10:
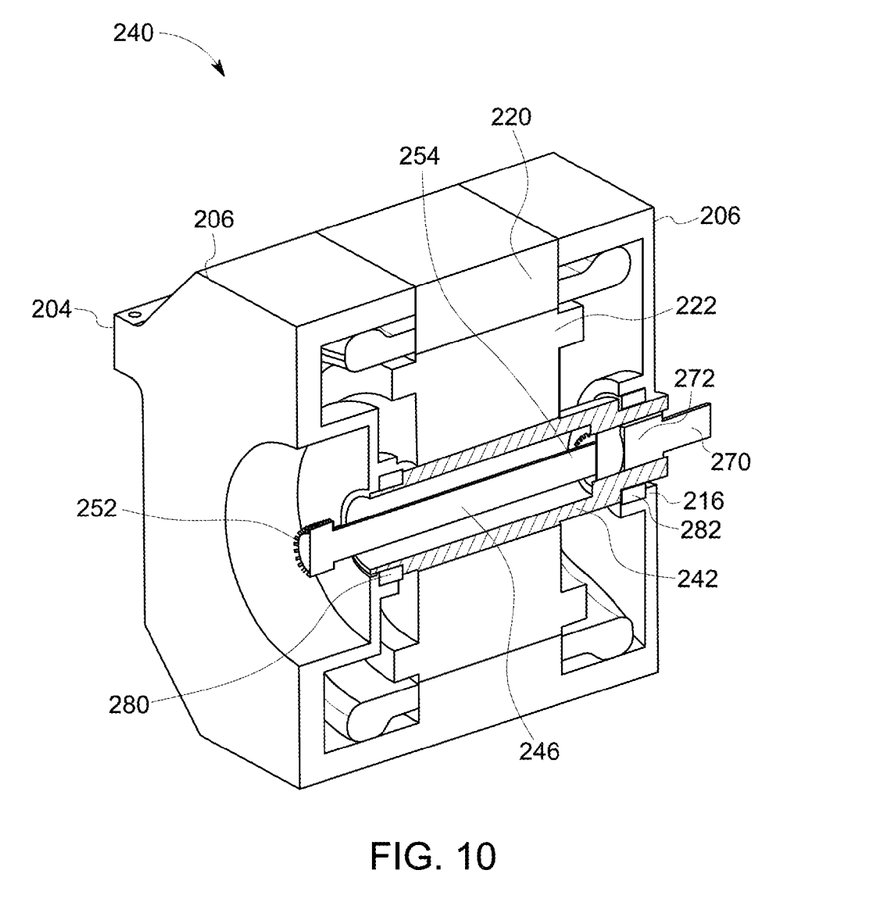
FIG. 10 is a cutaway perspective view of the motor of FIG. 8.

In one embodiment, a crowned spline rear drive shaft 246 is used to join motor 240 and axle 248. The crowned splined rear drive shaft 246 is configured such that it can tilt slightly to a maximum designed angular misalignment. Crowning 250 may be accomplished by a variety of means, e.g., gear shaving, etc., as long as sufficient angular misalignment is available (FIG. 7).

As shown in FIGS. 8-11, in an embodiment, the motor 240 includes a hollow rotor shaft 242 extending through the housing 202 from the first end to the second end. The hollow rotor shaft 242 includes a first end and a second end and is configured to removably receive an internal rear drive shaft 246 (e.g., the crowned spline rear drive shaft). In embodiments, the rear drive shaft 246 is supported by two bearings 280, 282, which may be roller bearings, ball bearings, etc. Journal bearings may be used as axle bearings.

Figure 11:
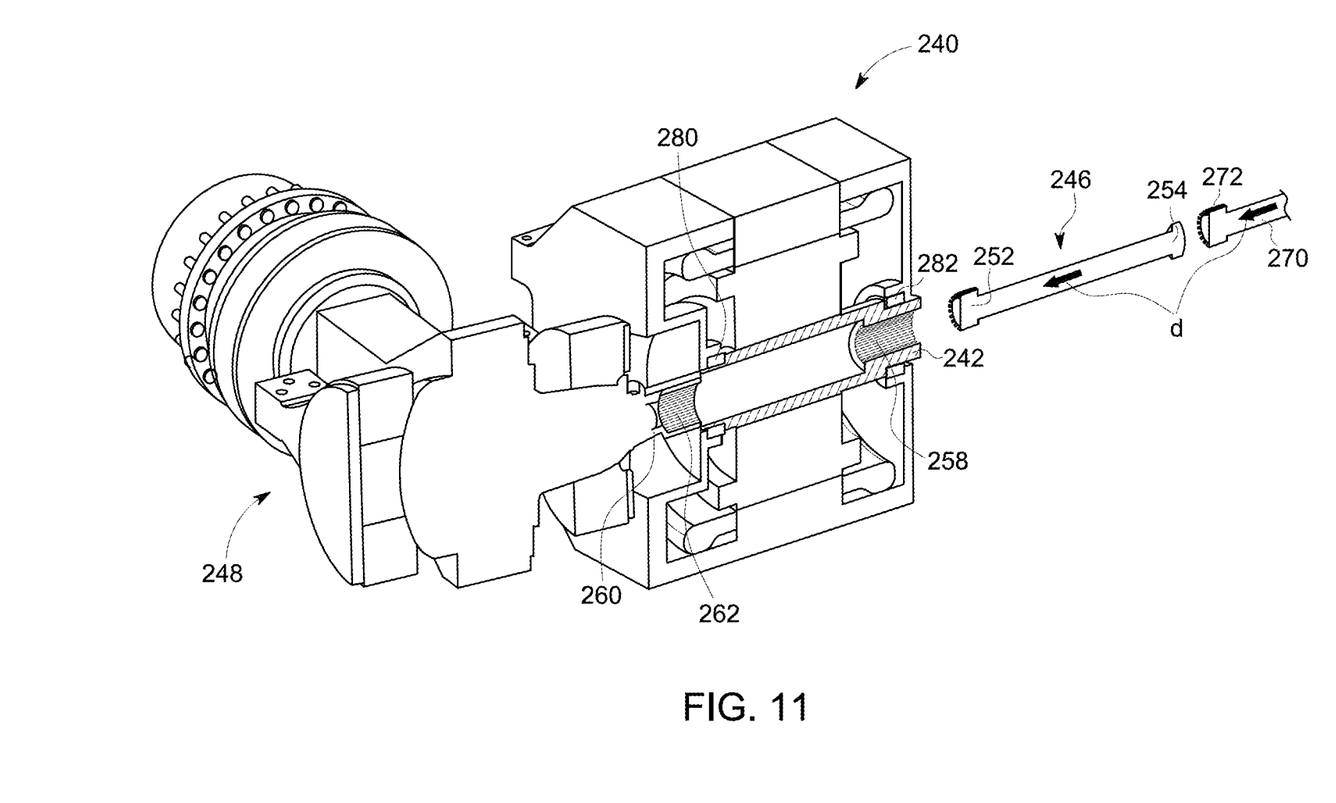
FIG. 11 is a cutaway partially exploded perspective view of the motor of FIG. 9.

As best illustrated in FIG. 11, the rear drive shaft 246 features two crown splined distal ends, 252, 254. When installed, splined end 254 matingly engages an interior spline surface 258, e.g., female surface, in the rotor shaft 242. The opposite crowned splined distal end 252 of the rear drive shaft matingly engages an axle input shaft 260, which includes a spline surface 262. As will be appreciated, a degree of angular misalignment is possible at both crown splined ends of the rear drive shaft 246 such that angular and lateral/vertical misalignments may be accommodated. While the crowned spline surface is shown on an exterior of the shaft 246, e.g., the male spline portion, it may be possible, in certain embodiments, to use crowned splining on an interior splined surface 258 of the rotor shaft 242. In alternate embodiments, it may be possible to utilize a hollow torque tube that mates externally with an axle input shaft.

In certain embodiments, a front drive shaft 270 containing a straight spline 272 is utilized. The straight spline portion 272 is configured to also matingly engage spline surface 258 such that the front drive shaft 270 may be rotated. Though the front drive shaft features a straight spline, it may also be possible in certain embodiments to utilize a crowned spline for this shaft as well. In embodiments, the front drive shaft 270 includes a U-joint, which is not depicted. In other embodiments, it may be possible to utilize other types of mechanical connections, other than a splined surface, to transmit power to the front axle such as a flange.

With specific reference to FIG. 11, in embodiments, during installation, the axle and motor are first joined and mounted to a vehicle frame. Once mounted, the rear drive shaft 246 is inserted into the hollow rotor shaft 242 in direction d until its crown splined end 252 engages the axle input shaft 260 and its crown splined end 254 engages spline surface 258 in the hollow rotor shaft 242. The front drive shaft 270 is then inserted such that its straight spline engages the spline surface 258. A bearing may be mounted on the rear drive shaft 246 to provide axial positioning of the same. Alternatively, a slot or other structure may be used to axially constrain the shaft 246. In certain embodiments, a bearing cap is tightened to secure the drive shaft 246 in place. The bearing cap may have tolerance to allow radial motion of the drive shaft bearing to accommodate deflections and external torque.

In other embodiments, the rear drive shaft may be connected to the rotor/rotor shaft via flex plates or elastomeric couplings.

FIGS. 12-16 relate to various embodiments of a heat transfer apparatus, which may be used in conjunction with the embodiments of FIGS. 1-11, or with other motors or electrical systems. Thus, although the embodiments of FIGS. 12-16 are illustrated in regards to motors and vehicle chasses generally, in other embodiments one or more of the motors, etc. of FIGS. 1-11 are outfitted with a heat transfer apparatus as described in regards to any of FIGS. 12-16.

Figure 12:
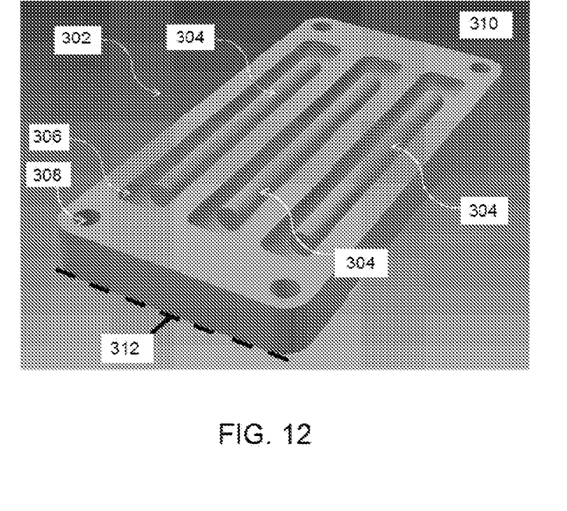
FIG. 12 is a perspective view of a heat transfer apparatus, having a metal plate with an embedded heat pipe, according to one embodiment.

FIG. 12 is a perspective view of heat transfer apparatus 310, according to an embodiment, that includes a metal plate 302 (e.g., steel plate), at least one channel 306 formed in the metal plate (e.g., by machining or molding), and at least one mounting point 308 to secure the metal plate to a vehicle chassis 312.

In another embodiment, the apparatus 310 further includes a heat pipe 304. The heat pipe 304 is embedded in the channel 306. In the embodiment shown, there are three channels 306 and three heat pipes 304. In other embodiments, the number of channels and heat pipes may vary depending on the application. In some embodiments, there may only be one channel 6 and one heat pipe 304. In some embodiments, the channels 306 may be formed by being machined into the metal plate 306.

Figure 13:
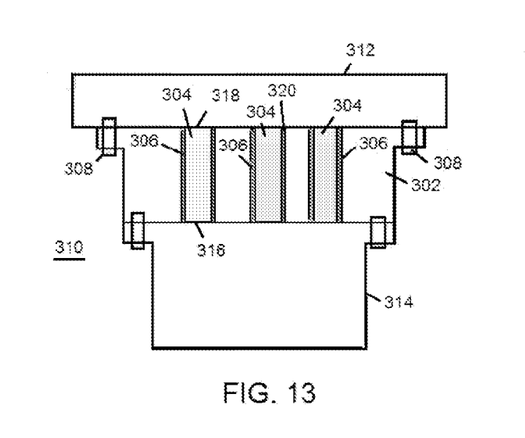
FIG. 13 is a cross-sectional schematic view of another embodiment of a heat transfer apparatus.

FIG. 13 is a cross-sectional schematic view of another embodiment of the heat transfer apparatus 310. Here, the metal plate 302 is secured to the vehicle chassis 312 such that one end 316 of each heat pipe 304 is exposed to a propulsion component 314 having a temperature that is higher than one or more other components of the vehicle (e.g., a higher temperature than the chassis 312), such that the heat pipe conducts heat from the propulsion component 314 to the chassis 312 and the heat is transferred to the chassis and dissipated.

In embodiments, each heat pipe 304 is secured in the corresponding channel 306 using an epoxy 320 that is configured to provide thermal contact with the metal plate.

Figure 14:
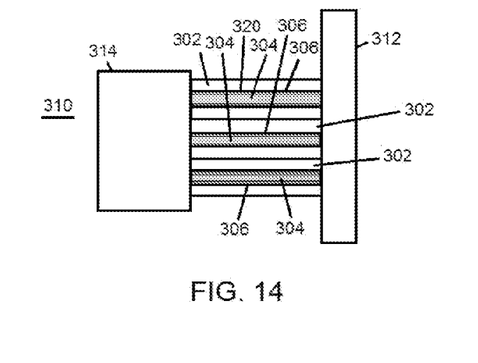
FIG. 14 is a cross-sectional schematic view of another embodiment of a heat transfer apparatus.

FIG. 14 is a cross-sectional schematic view of another embodiment of the heat transfer apparatus 310. Here, the apparatus includes a plurality of metal plates 302 that are secured to each other to form a stack of metal plates. Each of the plurality of metal plates 302 has at least one channel 306 formed therein and a respective heat pipe 304 secured in the channel. The attachment points on the plates may be used to attach the multiple plates to one another in order to stack the metal plates, to allow the stacking of the heat pipes 304.

Figure 15:
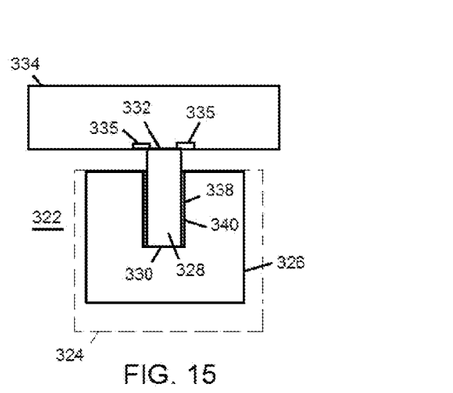
FIG. 15 is a cross-sectional schematic view of another embodiment of a heat transfer apparatus.

FIG. 15 is a cross-sectional schematic view of another embodiment of a heat transfer apparatus 322. The heat transfer apparatus includes an electrical machine 324 (e.g., motor) have a stator 326, and a heat pipe 328. A first end 330 of the heat pipe is attached to the stator 326 and a second end 332 of the heat pipe is attached to a vehicle chassis 334. The heat pipe is configured to transfer heat from the stator to the vehicle chassis. The second end of the heat pipe may be attached to mounting tabs 335 on the vehicle chassis.

In embodiments, the heat pipe 328 is routed through at least one blind hole 338 (i.e., hole with one open end and one closed end) formed in the stator 326. Additionally, in this or other embodiments, the heat pipe 328 may be secured with a thermal epoxy 340.

Figure 16:
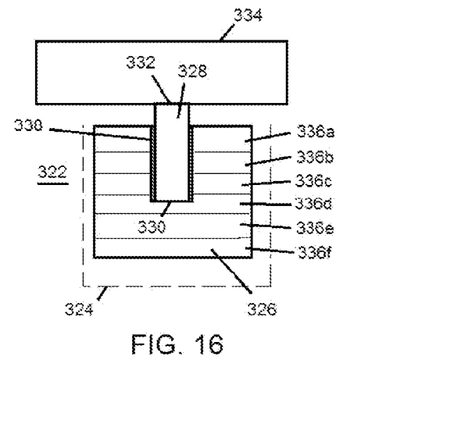
FIG. 16 is a cross-sectional schematic view of another embodiment of a heat transfer apparatus.

In another embodiment of the heat transfer apparatus, with reference to FIG. 16, the stator 326 comprises plural stator laminations 336a, 336b, 336c, 336c, 336d, 336e, 336f. The heat pipe is inserted radially into the stator laminations such that the heat pipe is routed through first regions of the stator laminations 336a, 336b, 336c, 336d that have a lower level of electromagnetic flux (when the electrical machine is in operation) than at least one other region 336e, 336f of the stator laminations. This is because the laminations through which the blind hole 338 is formed may "smear" or short together; positioning the blind holes in regions of lower electromagnetic flux reduces the effects of this configuration.

In embodiments, the second end 332 of the heat pipe is attached to heat spreaders (not shown) attached to the chassis.

The electrical machine 324 may be made of a frameless construction (e.g., the stator is integrated into the vehicle and lacks a separate housing, and/or if the electrical machine is a motor, bearings of the vehicle support a rotor of the motor), or it may be made of a framed construction (e.g., having a housing that supports the stator, such that the electrical machine is stand-alone; in embodiments where the electrical machine is a motor, the housing includes bearings that support a rotor of the motor).

In any of the embodiments herein, each heat pipe may comprise an evacuated, sealed pipe or tube (e.g., made of copper of aluminum) partially filled with a working fluid (e.g., water or ammonia, respectively) therein. The heat pipe is configured such that at a hot interface 316, 330 of the heat pipe, the liquid is in contact with a thermally conductive solid surface 326, 314 and turns into a vapor by absorbing heat from that surface. The vapor then travels along the heat pipe to the cold interface 318, 332 and condenses back into a liquid, releasing the latent heat. The liquid then returns to the hot interface through capillary action, centrifugal force, and/or gravity, and the cycle repeats. (Hot interface means hotter than the cold interface, and cold interface means cooler than the hot interface, in either case in at least one mode of operation of the apparatus and/or vehicle in which the apparatus is installed.)

Embodiments of the invention provide an apparatus that includes an electric motor having a shaft that is configured to be coupled to a vehicle axle wherein the axle may rotate about a longitudinal vehicle axis and the motor forms a structural member of the vehicle.

In an embodiment, an apparatus includes a housing having a first end and a second end, the housing including a first end cap at the first end thereof and a second end cap at the second end thereof, an oscillation bearing housed within the second end cap, and a hollow rotor shaft extending through the housing from the first end to the second end, the hollow rotor shaft having a first shaft end having an interior spline surface, and a second shaft end. The interior spline surface of the hollow rotor shaft is configured to receive a splined end of an internal rear drive shaft and a splined end of a front drive shaft. In an embodiment, the splined end of the internal rear drive shaft is a crowned splined end and the splined end of the front drive shaft is a straight splined end. In an embodiment, the apparatus may also include a first bearing mounted in the first end cap and supporting the first end of the hollow rotor shaft, and a second bearing mounted in the second end cap and supporting the second end of the hollow rotor shaft. In an embodiment, the second bearing is a cylindrical roller bearing. In an embodiment, the apparatus includes a rotor and a stator within the housing. In an embodiment, at least one of the first end cap and the second end cap is formed with a mounting bracket for attaching the apparatus to a frame of a vehicle. In an embodiment, the oscillation bearing is a split-type oscillation bearing having a mechanism for tightening and releasing the oscillation bearing around an axle bearing surface.

In another embodiment, a system includes an electric motor and an axle coupled to the electric motor. The electric motor includes a housing having a first end and a second end, a hollow rotor shaft extending through the housing from the first end to the second end, the hollow rotor shaft having a first shaft end having an interior spline surface, and a second shaft end, and a rear drive shaft received within the hollow rotor shaft, the rear drive shaft having a first splined end mating with the interior spline surface of the hollow rotor shaft and a second splined end opposite the first end. The axle includes an axle input shaft having an internal splined surface receiving the second splined end of the rear drive shaft. In an embodiment, the electric motor is mounted to a frame of a vehicle. In an embodiment, the housing of the motor includes a first end cap at the first end thereof and a second end cap at the second end thereof. In an embodiment, at least one of the end caps includes a mounting bracket, wherein the electric motor is mounted to the frame of the vehicle via the mounting bracket. In an embodiment, the system may also include an oscillation bearing housed within the second end cap. In an embodiment, the system may include a front drive shaft having a first splined end received by the interior spline surface of the hollow rotor shaft. In an embodiment, the first splined end of the front drive shaft includes a straight spline. In an embodiment, the first splined end of the rear drive shaft includes a crowned spline and the second splined end of the rear drive shaft includes a crowned spline. In an embodiment, the axle is a rear axle of the vehicle and the motor is mounted to the frame of the vehicle intermediate the rear axle and an operators cabin of the vehicle.

In yet another embodiment, a method of assembling a vehicle includes the steps of mounting an electric motor and an axle to a frame of the vehicle, the motor having a housing having a first end and a second end, and a hollow rotor shaft extending through the housing from the first end to the second end, the hollow rotor shaft having a first end having an interior spline surface, and a second end, and inserting a rear drive shaft into the hollow rotor shaft from the first end until a first splined end of the rear drive shaft mates with an axle input shaft of the axle and a second splined end of the rear drive shaft mates with an interior splined surface of the hollow rotor shaft. In an embodiment, the method may include the step of inserting a front drive shaft into the hollow rotor shaft from the second end until a first splined end of the front drive shaft is mates within the interior splined surface of the hollow rotor shaft. In an embodiment, the first splined end and the second splined end of the rear drive shaft include crowned splines. In an embodiment, the first splined end of the front drive shaft includes a straight spline. In an embodiment, the housing of the motor includes a first end cap at the first end thereof and a second end cap at the second end thereof, wherein at least one of the end caps includes a mounting bracket, and wherein the motor is mounted to the frame via the mounting bracket.

In an embodiment, a heat transfer apparatus includes at least one metal plate, at least one channel formed in the at least one metal plate, wherein the channel is formed to accept a heat pipe, and at least one mounting point to secure the at least one metal plate to a vehicle chassis of a vehicle.

In an embodiment, a heat transfer apparatus includes at least one metal plate, at least one channel formed in the at least one metal plate, wherein the channel is formed to accept a heat pipe, at least one mounting point to secure the at least one metal plate to a vehicle chassis of a vehicle, and a respective heat pipe secured in each of the channels.

In an embodiment, a heat transfer apparatus includes at least one metal plate, at least one channel formed in the at least one metal plate, wherein the channel is formed to accept a heat pipe, at least one mounting point to secure the at least one metal plate to a vehicle chassis of a vehicle, and a respective heat pipe secured in each of the channels. The at least one metal plate is secured to the vehicle chassis such that one end of the heat pipe is exposed to a propulsion component having a temperature that is higher than one or more other components of the vehicle, such that the heat pipe conducts heat from the propulsion component to the chassis and the heat is transferred to the chassis and dissipated.

In an embodiment, a heat transfer apparatus includes at least one metal plate, at least one channel formed in the at least one metal plate, wherein the channel is formed to accept a heat pipe, at least one mounting point to secure the at least one metal plate to a vehicle chassis of a vehicle, and a respective heat pipe secured in each of the channels. Each heat pipe is secured in the corresponding channel using an epoxy, the epoxy providing thermal contact with the metal plate.

In an embodiment, a heat transfer apparatus includes at least one metal plate, at least one channel formed in the at least one metal plate, wherein the channel is formed to accept a heat pipe, and at least one mounting point to secure the at least one metal plate to a vehicle chassis of a vehicle. The at least one metal plate comprises a plurality of metal plates that are secured to each other to form a stack of metal plates. Each of the plurality of metal plates has at least one of the at least one channel formed therein and a respective heat pipe secured in each of the at least one of the at least one channel.

In an embodiment, a heat transfer apparatus includes at least one metal plate, at least one channel formed in the at least one metal plate, wherein the channel is formed to accept a heat pipe, and at least one mounting point to secure the at least one metal plate to a vehicle chassis of a vehicle. Each of the at least one channel is formed by being machined into the at least one metal plate.

In another embodiment, a heat transfer apparatus includes an electrical machine have a stator and a heat pipe. A first end of the heat pipe is attached to the stator and a second end of the heat pipe is attached to a vehicle chassis. The heat pipe is configured to transfer heat from the stator to the vehicle chassis.

In another embodiment, a heat transfer apparatus includes an electrical machine have a stator and a heat pipe. A first end of the heat pipe is attached to the stator and a second end of the heat pipe is attached to a vehicle chassis. The heat pipe is configured to transfer heat from the stator to the vehicle chassis. The stator includes plural stator laminations and the heat pipe is inserted radially into the stator laminations such that the heat pipe is routed through first regions of the stator laminations that have a lower level of electromagnetic flux than at least one other region of the stator laminations.

In another embodiment, a heat transfer apparatus includes an electrical machine have a stator and a heat pipe. A first end of the heat pipe is attached to the stator and a second end of the heat pipe is attached to a vehicle chassis. The heat pipe is configured to transfer heat from the stator to the vehicle chassis. The second end of the heat pipe is attached to mounting tabs on the vehicle chassis.

In another embodiment, a heat transfer apparatus includes an electrical machine have a stator and a heat pipe. A first end of the heat pipe is attached to the stator and a second end of the heat pipe is attached to a vehicle chassis. The heat pipe is configured to transfer heat from the stator to the vehicle chassis. The second end of the heat pipe is attached to heat spreaders attached to the chassis.

In another embodiment, a heat transfer apparatus includes an electrical machine have a stator and a heat pipe. A first end of the heat pipe is attached to the stator and a second end of the heat pipe is attached to a vehicle chassis. The heat pipe is configured to transfer heat from the stator to the vehicle chassis. The heat pipe is routed through at least one blind hole formed in the stator.

In another embodiment, a heat transfer apparatus includes an electrical machine have a stator and a heat pipe. A first end of the heat pipe is attached to the stator and a second end of the heat pipe is attached to a vehicle chassis. The heat pipe is configured to transfer heat from the stator to the vehicle chassis. The heat pipe is routed through at least one blind hole formed in the stator. The heat pipe is secured with a thermal epoxy.

In another embodiment, a heat transfer apparatus includes an electrical machine have a stator and a heat pipe. A first end of the heat pipe is attached to the stator and a second end of the heat pipe is attached to a vehicle chassis. The heat pipe is configured to transfer heat from the stator to the vehicle chassis. The electrical machine is made of a frameless construction.

In another embodiment, a heat transfer apparatus includes an electrical machine have a stator and a heat pipe. A first end of the heat pipe is attached to the stator and a second end of the heat pipe is attached to a vehicle chassis. The heat pipe is configured to transfer heat from the stator to the vehicle chassis. The electrical machine is made of a framed construction.

In an embodiment, an apparatus (e.g., an apparatus for a vehicle) includes a housing, an oscillation bearing, and a hollow rotor shaft. The housing has a first end and a second end, and includes a first end cap at the first end thereof and a second end cap at the second end thereof. The oscillation bearing is housed within the second end cap. The hollow rotor shaft extends through the housing from the first end to the second end, and has a first shaft end having an interior spline surface, and a second shaft end. The interior spline surface of the hollow rotor shaft is configured to receive a splined end of an internal rear drive shaft and a splined end of a front drive shaft. The apparatus further includes a heat pipe. A first end of the heat pipe is attached to the housing and a second end of the heat pipe is attached to a vehicle chassis. The heat pipe is configured to transfer heat from the housing to the vehicle chassis.

In an embodiment, a system (e.g., a vehicle system) includes an electric motor and an axle coupled to the electric motor. The electric motor includes a housing having a first end and a second end, a hollow rotor shaft extending through the housing from the first end to the second end, and a rear drive shaft. The hollow rotor shaft has a first shaft end having an interior spline surface, and a second shaft end. The rear drive shaft is received within the hollow rotor shaft. The rear drive shaft has a first splined end mating with the interior spline surface of the hollow rotor shaft and a second splined end opposite the first end. The axle includes an axle input shaft having an internal splined surface receiving the second splined end of the rear drive shaft. The system further includes a heat pipe. A first end of the heat pipe is attached to the motor (e.g., to the housing, or to a stator of the motor, which may be part of, and/or built into the housing) and a second end of the heat pipe is attached to a vehicle chassis. The heat pipe is configured to transfer heat from the stator to the vehicle chassis.

In an embodiment, a system (e.g., a vehicle system) includes an electric motor and an axle coupled to the electric motor. The electric motor includes a housing having a first end and a second end, a hollow rotor shaft extending through the housing from the first end to the second end, and a rear drive shaft. The hollow rotor shaft has a first shaft end having an interior spline surface, and a second shaft end. The rear drive shaft is received within the hollow rotor shaft. The rear drive shaft has a first splined end mating with the interior spline surface of the hollow rotor shaft and a second splined end opposite the first end. The axle includes an axle input shaft having an internal splined surface receiving the second splined end of the rear drive shaft. The system further includes a heat pipe. A first end of the heat pipe is attached to a stator of the motor and a second end of the heat pipe is attached to a vehicle chassis. The heat pipe is configured to transfer heat from the stator to the vehicle chassis. The stator includes plural stator laminations and the heat pipe is inserted radially into the stator laminations such that the heat pipe is routed through first regions of the stator laminations that have a lower level of electromagnetic flux than at least one other region of the stator laminations.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described apparatuses, systems, and methods, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An apparatus, comprising:
   a housing having a first end and a second end, the housing including a first end cap at the first end thereof and a second end cap at the second end thereof;
   an oscillation bearing housed within the second end cap;
   a hollow rotor shaft extending through the housing from the first end of the housing to the second end of the housing, the hollow rotor shaft having a first shaft end having an interior spline surface, and a second shaft end;
   wherein the interior spline surface of the hollow rotor shaft is configured to receive a splined end of an internal rear drive shaft and a splined end of a front drive shaft;
   a first bearing mounted in the first end cap and supporting the first shaft end of the hollow rotor shaft;
   a second bearing mounted in the second end cap and supporting the second shaft end of the hollow rotor shaft; and
   a rotor and a stator within the housing, wherein at least one of the first end cap or the second end cap is formed with a mounting bracket for attaching the apparatus to a frame of a vehicle.

2. The apparatus of claim 1, wherein:
   the splined end of the internal rear drive shaft is a crowned splined end; and
   the splined end of the front drive shaft is a straight splined end.

3. The apparatus of claim 1, wherein the second bearing is a cylindrical roller bearing.

4. The apparatus of claim 1, further including stator end windings within the second end cap.

5. The apparatus of claim 4, wherein the stator end windings surround the oscillation bearing.

6. The apparatus of claim 1, wherein:
   the splined end of the internal rear drive shaft is a crowned splined end; and
   the splined end of the front drive shaft is a crowned splined end.

7. A system, comprising:
   an electric motor, the electric motor including:
   a housing having a first end and a second end;
   a hollow rotor shaft extending through the housing from the first end to the second end of the housing, the hollow rotor shaft having a first shaft end having an interior spline surface, and a second shaft end; and
   a rear drive shaft received within the hollow rotor shaft, the rear drive shaft having a first splined end mating with the interior spline surface of the hollow rotor shaft and a second splined end opposite the first splined end; and
   an axle coupled to the electric motor, the axle including an axle input shaft having an internal splined surface receiving the second splined end of the rear drive shaft.

8. The system of claim 7, wherein the electric motor is mounted to a frame of a vehicle.

9. The system of claim 8, wherein:
   the axle is a rear axle of the vehicle; and
   the electric motor is mounted to the frame of the vehicle intermediate the rear axle and an operator cabin of the vehicle.

10. The system of claim 8, wherein the housing of the electric motor includes a first end cap at the first end thereof and a second end cap at the second end thereof.

11. The system of claim 10, wherein:
    at least one of the end caps includes a mounting bracket; and
    the electric motor is mounted to the frame of the vehicle via the mounting bracket.

12. The system of claim 10, further comprising an oscillation bearing housed within the second end cap.

13. The system of claim 12, further including stator end windings within the second end cap.

14. The system of claim 13, wherein the stator end windings surround the oscillation bearing.

15. The system of claim 7, further comprising a front drive shaft having a first splined end received by the interior spline surface of the hollow rotor shaft.

16. The system of claim 15, wherein the first splined end of the front drive shaft includes a straight spline.

17. The system of claim 7, wherein:
    the first splined end of the rear drive shaft includes a crowned spline; and
    the second splined end of the rear drive shaft includes a crowned spline.

* * * * *